E. A. GREEN.
NUT LOCK RETAINER.
APPLICATION FILED MAY 10, 1915.
1,183,556.
Patented May 16, 1916.
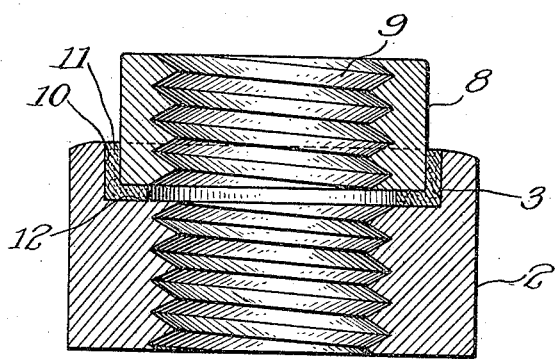
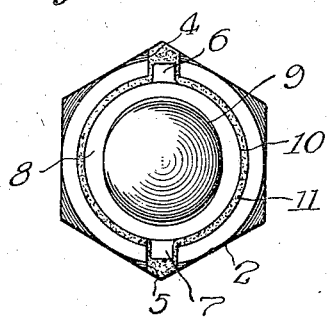
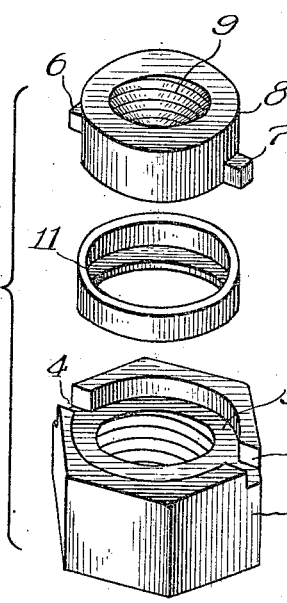
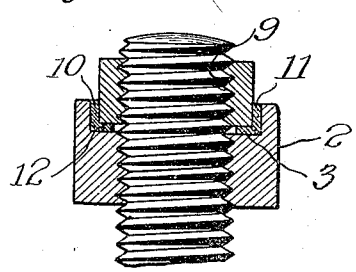
Witness:
A. J. Sauser.
Inventor:
Edward A. Green
By _____
Atty.

UNITED STATES PATENT OFFICE.

EDWARD A. GREEN, OF CHICAGO, ILLINOIS.

NUT-LOCK RETAINER.

1,183,556. Specification of Letters Patent. Patented May 16, 1916.

Application filed May 10, 1915. Serial No. 26,931.

*To all whom it may concern:*

Be it known that I, EDWARD A. GREEN, a citizen of the United States, residing at Chicago, in the county of Cook and State of Illinois, have invented certain new and useful Improvements in Nut-Lock Retainers, of which the following is a specification.

The present invention relates to simple, convenient and water proof means for elastically assembling my improved nut and retainer and permitting them to properly space apart, the objects being to guard against unskilled handling of my improvement and to relieve the mechanic of the duty of selecting proper sealing material and the work incidental to the provision of a water proof seal, at a saving of time and labor coupled with increased efficiency.

With these objects in view my invention consists in the novel binder and seal for a nut and retainer embodying my invention, all as hereinafter described in detail, illustrated in the accompanying drawing, and incorporated in the appended claims.

In the drawing—Figure 1 is a section through my improved nut and retainer to which the present invention has been applied. Fig. 2 is a top plan view on a reduced scale. Fig. 3 is a perspective view of the nut, lock and cohesive binder separated. Fig. 4 is similar to Fig. 1 with a threaded section of bolt added.

In the several views 2 is an ordinary nut with a recess 3 in its upper face, this recess being in the form of a counterbore of the threaded hole in the nut. Diametrically opposed to each other in the walls of the recess 3 are cut-outs 4 and 5 which engage lugs 6 and 7 of my improved nut retainer 8, which is in the form of an interiorly threaded collar slightly flattened to give it an elastic grip upon the threads of the bolt to prevent its rotation. The engagements of the lugs 6 and 7 with the nut prevent the latter from rotating. Iron, as well as steel, is elastic, and will return to its original form when stress is removed, providing that this stress does not exceed the elastic limit of the metal so as to produce a "permanent set" beyond the elastic limit. Such excess of stress can hardly take place when the transversely slightly elliptical bore —9— of my improved retainer is turned onto a bolt, even when the retainer is made of comparatively inelastic iron, as the tubular form of the retainer gives a cumulative effect of the elasticity in the metal, at the points of contact with the bolt, hence my nut and retainer may be repeatedly removed and replaced without the retainer losing its elastic energy for nut lock purposes. For these reasons I have found that I can in the manufacture of the nut and retainer make them substantially a single member, and this without being obliged to resort to prohibitively expensive and complicated mechanical coupling means.

In its coöperation with a nut and bolt the retainer enters the nut recess 3 but is spaced away from the bottom thereof in order that the strains longitudinally of the bolt may not be transmitted from nut to retainer. In its lateral dimensions the recess 3 is made large enough to provide an annular space 10.

The herein illustrated embodiment of my present improvement is in the form of a combined ring and washer of suitably cohesive and plastic or elastic material. Coal tar and asphaltum are suitable plastic materials which may be poured while in a liquid state into the recess 10 and the space between the nut and the retainer, the latter space being designated as 12. When either of these or like, materials "set" they form a plastic, very cohesive, and water-proof joint between the nut and the retainer, which, while firmly combining the nut and retainer into one member, leaves each a substantially separate member for the aforementioned lock nut purposes. The nut and retainer may be thus assembled either in the factory, or before they are applied to the work they are to serve, or they may be thus permanently engaged with each other by the individual mechanics using them, after the nut and the lock therefor have been placed in service, though, as stated, one of the objects of this invention is to relieve workmen of this work at the place of service.

As a water tight washer and ring between the nut and retainer, the coal tar or asphaltum binder will not, owing to its ductility, transmit strains or vibrations liable to impair the integrity of the lock, and whether the retainer is applied to its bolt or removed its efficiency does not impair, for, according to recognized authorities on this subject, a "rest" increases the resistance of wrought iron, the gain in ultimate resistance by a rest having been found to vary from 4.4 to 17 per cent. This "rest" may be an entire release from stress or a simple holding the test-piece at a given intensity of stress. "This elevation of elastic and ultimate resistance appears to be peculiar to iron and steel," and in specimens that have been under observation for a period exceeding thirty eight months, a very substantial gain has been found in my retainer, which is preferably made from cold drawn steel the drawing process raising the elastic limit of the metal to perhaps double that of the original bar. Under these circumstances no objections have been found to binding the nut and retainer together, while the cohesive binding means permit ready separation of nut and retainer when desired. The provision of the binder at the factory insures each nut being equipped with a retainer, and when a nut is removed from a bolt its retainer is not accidentally misplaced or lost. This combination and arrangement is also a protection against unskilled manipulation by workmen, as the spacing and coupling binder insures proper spacing by specially skilled workmen at the factory for the purpose of guarding the retainer against longitudinal strains from the nut.

I claim as my invention—

1. The combination with a nut having a recess therein, of a retainer entering said recess, and an interposed cohesive binding said nut and retainer together as a single member.

2. The combination with a nut, of a retainer spaced apart from said nut, and a plastic washer between said nut and retainer which binds same together.

3. The combination with a nut having a recess in its upper face, of a retainer engaging said nut against rotation thereof, and a seal of plastic material interposed between the opposing surfaces of said nut and retainer.

4. The combination with a nut and a retainer, the former having a recess in its face into which said retainer projects, said recess leaving an annular space between the outer edges of the retainer and the circumferential wall of said recess, and a band of cohesive and plastic material which cements said nut and retainer to each other and forms a seal against moisture between said nut and retainer.

5. The combination with a nut and retainer engaged with each other against relative rotation, of a plastic joint between said nut and retainer resisting their movement apart.

6. The combination with a nut having a counterbore recess in one of its faces, of a combined band and washer between said nut and retainer which forms a union between the nut and retainer.

In testimony whereof I have hereunto subscribed my name.

EDWARD A. GREEN.

Copies of this patent may be obtained for five cents each, by addressing the "Commissioner of Patents, Washington, D. C."